United States Patent Office 3,128,738
Patented Apr. 14, 1964

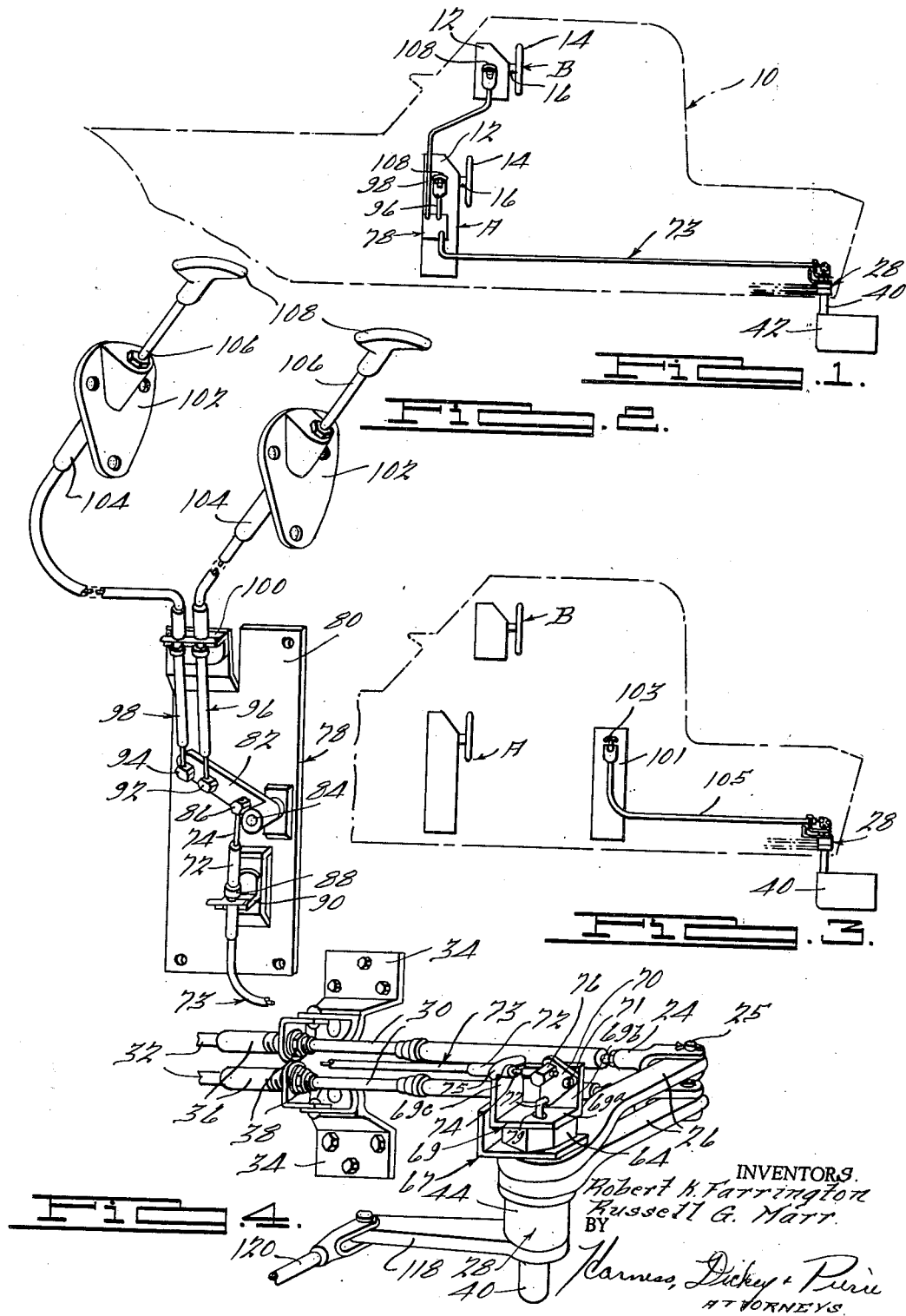

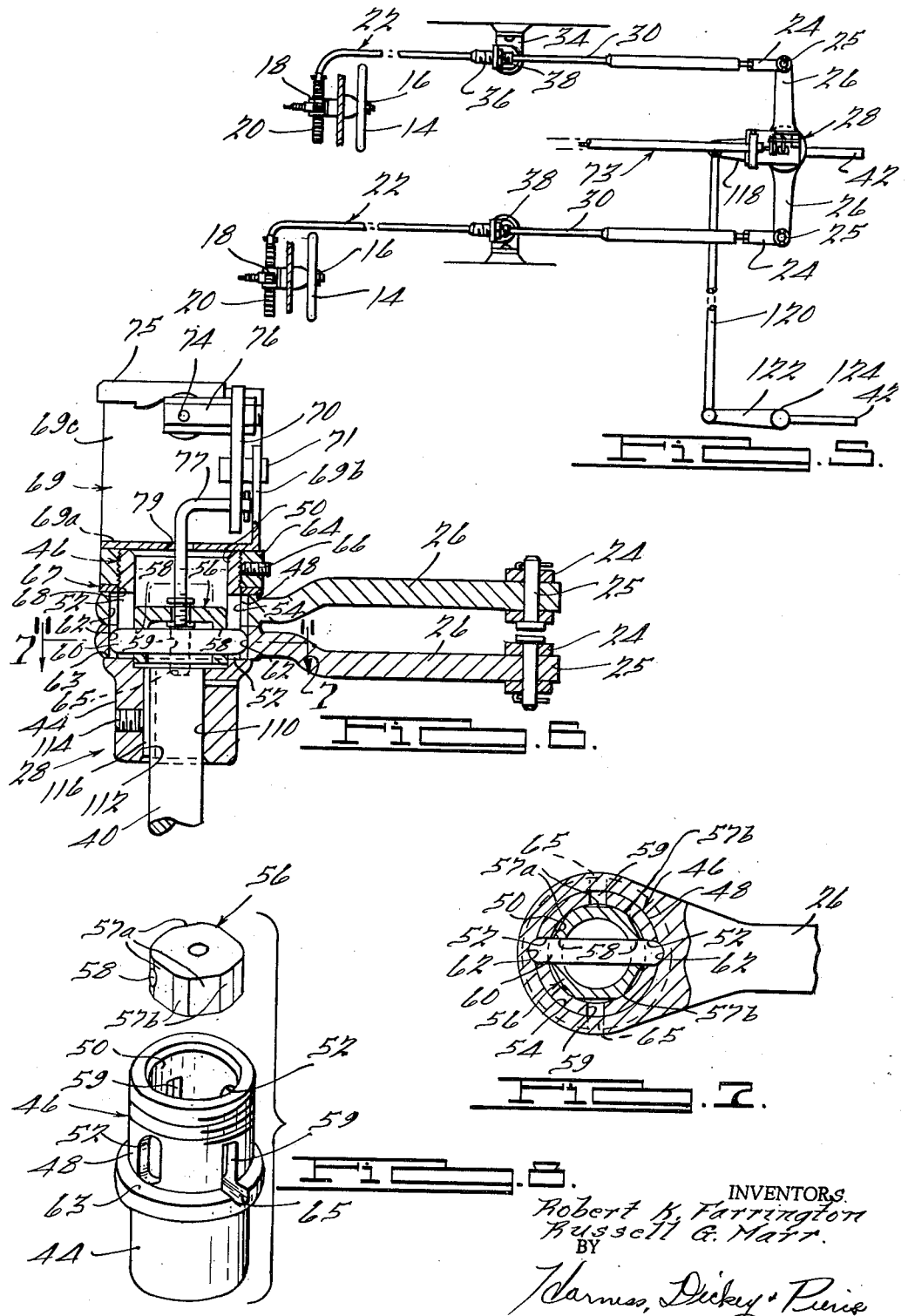

3,128,738
DUAL STATION STEERING MECHANISM
Robert K. Farrington, Shaker Heights, Ohio, and Russell G. Marr, Detroit, Mich., assignors to Marmac Products, Inc., Cleveland, Ohio, a corporation of Ohio
Filed Mar. 27, 1963, Ser. No. 268,284
11 Claims. (Cl. 114—144)

The present invention broadly relates to steering control systems, and more particularly to a multiple station steering system for boats whereby only one steering unit is drivingly coupled to the rudder at one time while the remaining steering units are disconnected therefrom.

A variety of situations occur wherein it is desirable to provide control of an apparatus from several diversely spaced locations. This is particularly true in steering systems for relatively large pleasure craft wherein it is frequently desirable to provide two or more stations from which the boat can be steered, such as, for example, from inside the cabin, from the flying bridge, and from the afterdeck. Certain disadvantages are present in multiple station steering systems of the types heretofore used or proposed for use due to their complexity, high cost, difficulty of installation and maintenance, and the concurrent operation of all units with a corresponding high drag resistance and loss of control feel.

It is accordingly a principal object of the present invention to provide an improved multiple station steering system which overcomes the disadvantages inherent in multiple station steering systems of the types heretofore known.

Another object of the present invention is to provide an improved multiple station steering system which simply enables the selective coupling of one manual steering unit to the rudder post and whereby the remaining manual steering units are disengaged therefrom eliminating the wear and associated drag resistance of the remaining disconnected units.

Still another object of the present invention is to provide a multiple station steering system in which the several operative components thereof are interconnected by flexible push-pull cables enhancing the versatility and flexibility of locating the individual steering and control units avoiding interference with other structural components of the boat.

A further object of the present invention is to provide an improved multiple station steering system which is of simple design; of easy, versatile, and simple installation; of reliable and durable operation; of simple service and maintenance; and of economical installation and manufacture.

The foregoing and other objects and advantages of the present invention are achieved by a multiple station steering system for boats, such as pleasure craft and the like provided with a plurality of diversely spaced manual steering units each of which is drivingly coupled to a corresponding number of steering arms rotatably mounted on an interchange device which in turn is rotatably mounted and drivingly coupled to one or a plurality of rudders. Control means are provided at each steering station, or alternatively, at one convenient central location, which are operatively connected to the interchange mechanism for selectively engaging and coupling one of the steering arms and the respective steering unit connected thereto to the rudder while the remaining steering arms and steering units are disconnected therefrom and remain stationary eliminating attendant wear and drag resistance during their non-use.

Other objects and advantages of the present invention will become apparent from the following detailed description taken in conjunction with the accompanying drawings, wherein:

FIGURE 1 is a schematic side elevational view partly in phantom illustrating an exemplary dual station steering system for a boat constructed in accordance with the present invention;

FIGURE 2 is a fragmentary perspective view of one satisfactory embodiment of a control system providing selective control at each steering station and of a transfer device operatively associated therewith for selecting which steering unit is to be operatively connected to the rudders;

FIGURE 3 is an alternative satisfactory embodiment of a control system wherein the selector handle is located at a convenient central location such as in the deckhouse, for example, and the control cable is directly coupled to the steering unit;

FIGURE 4 is a fragmentary perspective view of the interchange device incorporating a pair of steering arms thereon which are drivingly connected to the manual steering unit at each of the dual steering station;

FIGURE 5 is a fragmentary plan view partly schematic illustrating the interrelationship between the manual steering units of a dual station steering system connected to an interchange device drivingly coupled to a pair of spaced rudder bars;

FIGURE 6 is a vertical sectional view of the interchange device shown in FIGURE 4 mounted on the upper end of a rudder post;

FIGURE 7 is a transverse sectional view through the interchange device shown in FIGURE 6 and taken along the line 7—7 thereof; and FIGURE 8 is a perspective exploded view of the body member and piston of the interchange device.

Referring now in detail to the drawings, an exemplary dual station steering arrangement is illustrated in FIGURE 1 wherein a steering station generally designated A is located in the cabin and a second steering station indicated at B is located on the flying bridge of a boat 10 indicated in phantom. In the majority of instances, a dual station steering system as illustrated in the drawings is adequate. It will be understood, however, that three or more independent manual steering stations can be provided, if desired, achieving selective independent control in accordance with the apparatus comprising the present invention.

Each of the steering stations as shown in FIGURE 1 is provided with a console 12 on which a manually operable steering unit such as a steering wheel 14 is mounted for manual control by the pilot. The specific construction of the manual unit is not critical in order to achieve the benefits of the present invention and may comprise as exemplarily shown in FIGURE 5, a shaft 16 on which the steering wheel 14 is mounted, which is provided with a pinion gear 18 disposed in constant meshing relationship with the rack 20 reciprocable transversely of the shaft 16. To one end of each of the racks 20, the end of a push-pull type steering cable 22 is affixed which extends therefrom and is connected by means of a suitable bifurcated fitting 24 and pin 25 as shown in FIGURE 4, to the end of a steering arm 26 rotatably mounted on an interchange device designated 28.

The push-pull steering cable 22 is of the type well known in the art and as shown in FIGURE 4, comprises a flexible housing 30 in which a cable 32 is slidably disposed. The ends of the cable 32 are securely affixed to suitable fittings such as the fitting 24 by means such as by swaging, for example. The flexible housing 30 is stationarily fixed and supported by suitable brackets 34 as shown in FIGURES 4 and 5 which in turn are securely fastened to the hull or frame components of the boat.

The housing 30 is provided with a suitable threaded collar 36 on which a clamping nut 38 is threadably engaged for rigidly securing the flexible housing to the bracket 34. In accordance with the arrangement shown, the transverse reciprocation of the rack 20 in response to the rotation of the steering wheel 14 provides for a corresponding reciprocation of the cable 32 in the flexible housing 30 which in turn is translated into an angular movement of the steering arm 26 connected thereto.

The rotative torque applied to the steering arm 26 is transmitted by the interchange device 28 to a rudder post 40 having a rudder vane 42 affixed to the lower end thereof. As best seen in FIGURES 4, 6, and 8, the interchange device 28 comprises a housing or body 44 which is formed with a tubular portion or section 46 comprising an outer cylindrical surface 48 and an inner cylindrical bore 50 which is disposed in axial alignment with the axis of the outer cylindrical surface 48. The bore 50 as viewed in FIGURE 6, extends inwardly from the upper portion of the body 44 to a point spaced about midway from the opposite end of the body. The outer cylindrical surface and inner cylindrical bore define an annular wall around which the pair of steering arms 26 are rotatably disposed in appropriate longitudinally spaced relationship therealong. The annular wall of the tubular portion 46 is formed with a pair of diametrically opposed longitudinally extending apertures or slots 52 which are positioned so as to underlie the overlying cylindrical surfaces 54 defined by the axial bores through the steering arms 26.

A slide member or piston 56 is slidably disposed within the tubular portion 46 and is reciprocable therein to and from a first position as shown in solid lines in FIGURE 6 to a second position axially spaced therefrom as shown in phantom. The piston 56 as best seen in FIGURES 7 and 8 is preferably of a polygonal or irregularly shaped cross section such as, for example, a hexagonal configuration. In the exemplary embodiment as shown in FIGURES 7 and 8, the peripheral surface of the piston 56 is comprised of six substantially flat faces 57a which are interconnected along their edges by arcuate faces 57b of a relatively large radius and which are adapted to be disposed in sliding bearing contact with the surface of the inner cylindrical bore 50. The bearing contact between the arcuate faces 75b and the inner surface of the bore 50 is effective to maintain the piston in appropriate axial alignment relative to the axis of the bore 50 when the piston is disposed in the first position and second position as shown in FIGURE 6 and during its reciprocating movement therebetween. The clearance space provided between each of the substantially flat faces 57a and the surface of the inner cylindrical bore 50 provides passageways through which any water and entrained solid matter such as sand, etc., can pass to the base of the bore 50 thereby avoiding any binding of the piston within the bore. A pair of diametrically disposed drainage slots 59, as best seen in FIGURE 8, are provided in the tubular section 46 which are preferably disposed at an angle of about 90° from the slots 52 and which drainage slots provide passageways through which the water and foreign solid material is drained from the interior of the body 44.

The piston 56, as shown in FIGURES 6–8, is formed with a pair of diametrically disposed apertures 58 for slidably receiving an engaging key 60 which is of a length such that the end or lug portions thereof extend through the slots 52 and project beyond the outer cylindrical surface 48 of the tubular portion 46. The engaging key 60 is of a thickness so as to provide a sliding clearance fit in the apertures 58 of the piston 56 and in the longitudinally extending slots 52 of the tubular portion 46. The axial width of the engaging key 60 is slightly less than the axial dimension of the cylindrical surfaces 54 of the steering arms 26 to avoid any overlapping of the engaging key of both steering arms when in the raised or lowered position as shown in FIGURE 6.

The inner cylindrical surfaces 54 of the steering arms 26 are formed with diametrically disposed axially extending grooves 62 which are adapted to slidably receive the projecting lug end portions of the engaging key 60 effecting engagement of that steering arm to the body 44 preventing relative rotation therebetween. The engaging end portions of the engaging key 60 are preferably rounded and the mating edges of the grooves 62 of adjacent steering arms are preferably chamfered to facilitate appropriate indexing and alignment of the two steering arms during movement of the piston between the two positions.

In accordance with the construction of the interchange device as hereinabove set forth, engagement of one of the steering arms 26 provides for manual control by the steering unit connected thereto while the other steering unit and steering arm are disconnected and are free to rotate around the tubular portion 46 of the interchange device. The two steering arms are maintained in appropriate longitudinal relationship on the tubular portion 46 by means of a shoulder 63 formed on the body 44 and a collar 64 which is disposed in threaded engagement on the threaded end portion of the tubular portion 46 preventing relative axial movement of the steering arms along the tubular portion. The shoulder 63 is provided with a pair of diametrically disposed grooves 65 which are positioned, respectively, in communication with the lower end portions of the drainage slots 59 as best seen in FIGURE 8, providing a channel and facilitating wash-through and drainage of any water and foreign matter from the interior of the tubular section 46. An L-shaped plate 67 provided with a bore 68 is rotatably journaled on the tubular section 46 and is slidably clamped between the upper steering arm 26 and the collar 64 as best shown in FIGURES 4 and 6. The collar 64 is locked in appropriate clamped position to enable free rotation of the L-shaped plate 67 by means of a set screw 66 as shown in FIGURE 6.

The L-shaped plate 67 serves as a mounting platform on which an actuator cable is mounted for effecting reciprocation of the piston 56 providing selective engagement of one of the plurality of steering arms of the interchange device. As best seen in FIGURES 4 and 6, an L-shaped bracket 69 is rigidly affixed to the upstanding leg of the L-shaped plate 67 and is disposed with its base 69a overlying the upper surface of the collar 64 in a manner so as to form a shield minimizing the entry of water and other foreign matter into the interior of the body 44. The base 69a is formed with an upstanding ear 69b to which a triangular-shaped bellcrank 70 is pivotally secured by means of a pivot pin 71. A flexible housing 72 of an actuator cable 73 is securely fastened to the upper end portion of the upstanding leg 69c of the L-shaped bracket 69 by means of a securing clip 75. The movable cable core 74 of the push-pull actuator cable 73 extends in a substantially horizontal direction from the flexible housing 72 and has its end affixed to a fitting 76 pivotally mounted on the bellcrank 70.

A link 77 is pivotally connected to the lower end portion of the bellcrank 70 and extends downwardly therefrom through an aperture 79 in the base 69a of the L-shaped bracket and is rotatably and adjustably fastened to the head of the piston 56 as shown in FIGURE 6. In accordance with the arrangement shown, movement of the cable core 74 of the push-pull actuator cable 73 in response to manual actuation effects axial reciprocation of the piston 56 and the engaging key 60 carried thereby within the tubular portion and is appropriately positionable thereby to selectively couple either of the two steering arms 26 to the body of the interchange device.

It will be appreciated by those skilled in the art that the cable core 74 of the actuator cable 73 can be directly connected to the piston 56 to achieve reciprocatory movement thereof. In accordance with the preferred linkage arrangement as shown in the drawings, the use of a bellcrank linkage system enables the actuator cable 73 to be disposed in a horizontal position minimizing the clearance space required above the upper end of the interchange device. In addition, the rotatability of the L-shaped plate 67 relative to the interchange device enables the cable and supporting brackets to remain substantially stationary in spite of the angular displacement of the interchange device avoiding thereby the imposition of any bending stresses on the actuator cable and connecting linkages. The axial alignment of the link 77 and its pivotal connection to the piston 56 enables the piston to rotate with the interchange device without effecting any binding or misalignment of the bellcrank and linkage system.

The actuator cable 73, in accordance with the embodiment as shown in FIGURE 1, is connected to a transfer device indicated at 78 in FIGURE 2 which in turn is drivingly coupled to a push-pull cable control system mounted conveniently at each of the steering stations. As shown in FIGURE 2, the transfer device 78 comprises a mounting plate 80 on which a lever 82 is pivotally mounted by means of a pin 84. To the inner end portion of the lever 82 adjacent to the pin 84, a ball socket connector 86 is affixed having its connecting link rigidly affixed to the cable core 74 of the push-pull actuator cable 73. The flexible housing 72 of the actuator cable is provided with a collar 88 which is affixed to a bracket 90 secured to and projecting from the mounting plate 80.

The outer end portion of the lever 82 is provided with a pair of ball-socket-type connectors 92, 94, which in turn are connected, respectively, to push-pull control cables 96 and 98. Cable brackets 100 are affixed to and project from the mounting plate 80 for adjustably securing the outer flexible housing of the push-pull control cables 96, 98. The control cables 96, 98 extend from the transfer device to a convenient position at each of the steering stations such as at the positions on the sides of the consoles 12 of steering stations A and B as shown in FIGURE 1. The transfer device itself can conveniently be mounted on the side of the console of steering station A as schematically shown in FIGURE 1.

Manual actuation of either of the control cables can be suitably achieved such as by a push-pull assembly shown in FIGURE 2 comprising a housing formed with a mounting flange 102 and including an angularly extending tubular member 104 in which a shaft 106 having a T handle 108 on the outer end thereof is slidably disposed. The lower end of the shaft 106 is rigidly affixed to the core cable of the control cable effecting longitudinal sliding movement thereof in response to a pulling out or pushing in of the T handle. In accordance with the arrangement shown, the pulling of the T handle 108 outwardly at one station effects a corresponding movement of the lever 82 with a resulting outward movement of the other T handle and vice versa. The position of the T handle can be conveniently correlated as to which steering unit and steering station is engaged and which steering unit is disengaged. For example, in the exemplary arrangement shown in FIGURE 1, when the T handle 108 is in the outward or upward position, the upper steering station B in the flying bridge is operatively connected to the rudder; whereas, when the T handle 108 is in the inward or lower position, then the lower steering station A located in the cabin is engaged. By virtue of this arrangement, the operator by simply glancing at the position of the T handle, at either steering station, can tell which steering unit is operatively connected to the steering system.

The angular movement transmitted to the lever 82 by the actuation of one of the T handle controls is in turn transmitted through the actuator cable to the piston 56 in the interchange device effecting appropriate axial positioning thereof and engagement of one of the two steering arms therearound. The engaged steering arm in turn transmits the rotative torque applied thereto by the push-pull steering cable connected to the manual steering unit connected thereto. Conventionally, a shifting between one of the two manual steering units is achieved when the steering units are in their neutral position and in which position the grooves 62 in adjacent steering arms are disposed in appropriate substantially axial alignment. Slight deviations between the axial alignment of the grooves 62 in adjacent steering arms can be readily corrected by turning the wheel of the steering unit to be engaged while exerting a slight force on the T handle until the piston and engaging key move to the engaging position.

An alternate satisfactory arrangement for controlling which steering unit is to be coupled to the interchange device is illustrated in FIGURE 3. As shown in FIGURE 3, a control console indicated at 101 is located at a convenient central location where it is readily accessible to the operator of the boat. The control console 101 or a suitable supporting structure of the boat serves to mount a T handle 103 of the type shown in FIGURE 2 which is connected to a push-pull control cable 105 which extends downwardly and rearwardly therefrom and is directly connected to the interchange device in a manner identical to the connection of the actuator cable 73 as shown in FIGURE 6. In accordance with this arrangement, a transfer device 78 of the type shown in FIGURE 2 is not required and appropriate reciprocable positioning of the piston within the interchange device 28 is achieved by the manipulation of the T handle 103. The T handle 103 can be correlated in position such that when it is in its outward or upper position, the steering wheel of upper steering station B is connected to the rudder 40 whereas when the T handle 103 is in the inward or down position, the steering wheel of station A is operatively connected to the rudder 40. The operation and structural features of the interchange device 28 are identical regardless of whether a separate control handle is provided at each steering station in accordance with the embodiment as shown in FIGURES 1 and 2 or a single centrally located control handle is provided as shown in FIGURE 3.

The body 44 of the interchange device 28 is formed with an engaging bore 110 extending axially inwardly from the lower end thereof as viewed in FIGURE 6 and which bore in turn is disposed in axial alignment with the axis of the tubular portion 46. The engaging bore 110 is provided with a suitable key slot 112 and set screw 114 for securely fastening the interchange device by means of a key 116 on a rotatable shaft and preferably directly to the rudder post 40. The rotative torque applied to the coupled steering arm is accordingly transmitted from the grooves 62 in the steering arm to the ends of the engaging key and through the engaging key 60 to the side edges of the slots 52 of the tubular portion 46 which in turn is transmitted through the key 116 to the rudder post 40 keyed thereto. Alternatively, the interchange device can be mounted on a suitable rotatably mounted shaft which in turn is provided with connecting linkage such as a chain and sprocket arrangement for coupling the shaft to the rudder post of the boat.

Two alternate satisfactory steering arrangements employing the interchange device are shown in FIGURES 4 and 5. In the arrangement shown in FIGURE 4, both of the push-pull steering cables 22 are mounted adjacent to each other and the steering arms 26 extend laterally in substantially the same direction relative to the rudder post. In the arrangement shown in FIGURE 5, the steering arms 26 are arranged in substantially diametrically opposed relationship having their ends connected respectively to the push-pull steering cables 22 which extend in spaced relationship along the hull of the boat.

In either case, the steering system as illustrated, is adapted to simultaneously control two rudders when a boat is so equipped by employing a lever arm 118 which is connected by a drag link 120 to a second lever arm 122 affixed to the rudder post 124 disposed adjacent to the rudder post 40 on which the interchange device is mounted. The lever arm 118 can be fixedly incorporated adjacent to the base of the interchange device or can be separately mounted on the rudder post, as desired.

It is also contemplated that the interchange and transfer devices hereinabove described can be satisfactorily employed for selectively coupling one of three or more steering arms and manual steering units connected thereto to a rudder post providing for a disconnection of the units not in use substantially eliminating their associated drag and wear. In such case, the tubular portion 46 of the interchange device is lengthened to accommodate the additional number of steering arms and an additional push-pull control cable equipped with a T handle is provided at each additional station so as to selectively position the piston and the engaging key in appropriate engaging relationship with the specific steering arm to be coupled. Alternatively, when a single centrally located control station incorporating a single control handle is used, selection of the steering unit to be coupled to the steering mechanism can be achieved by selectively positioning the T handle at the appropriate position between the fully inward and fully outward positions.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a multiple station steering system for a boat including a plurality of diversely spaced steering units drivingly connected respectively to a corresponding number of steering arms, the improvement comprising an interchange assembly for selectively coupling only one of said steering arms and the steering unit connected thereto to a rudder post, said interchange device comprising a body, means for rotatably mounting said body in a boat, coacting means for drivingly coupling said body to a rudder post, said body including a cylindrical portion disposed with its axis in alignment with the axis of rotation of said body and formed with an axial bore therein, said cylindrical portion provided with a longitudinally extending elongated aperture disposed in communication with said bore, slide means slidably disposed and axially reciprocable in said bore, engaging means on said slide means extending through said aperture and projecting beyond the periphery of said cylindrical portion, a plurality of steering arms each formed with a cylindrical bore defining a cylindrical surface disposed in rotatable bearing contact around said cylindrical portion and overlying said aperture, each said cylindrical surface formed with an axially extending groove for slidably receiving and engaging said engaging means, means for maintaining said arms in appropriate longitudinally spaced relationship along said cylindrical portion, coacting means on each of said steering arms for connecting each arm to a steering unit, and means for selectively positioning said slide means and said engaging means thereon within said bore for engaging said groove of one of said steering arms and coupling that arm to said body.

2. In a dual station steering system for a boat including a pair of diversely spaced steering units drivingly connected respectively to a pair of steering arms, the improvement comprising an interchange assembly for selectively coupling one of said pair of steering arms and the steering unit connected thereto to a rudder post, said interchange device comprising a body, means for rotatably mounting said body in a boat, coacting means for drivingly coupling said body to a rudder post, said body including a cylindrical portion disposed with its axis in alignment with the axis of rotation of said body and formed with an axial bore therein, said cylindrical portion provided with a longitudinally extending elongated aperture disposed in communication with said bore, slide means slidably disposed and axially reciprocable in said bore, engaging means on said slide means extending through said aperture and projecting beyond the periphery of said cylindrical portion, a pair of steering arms each formed with a cylindrical bore defining a cylindrical surface disposed in rotatable bearing contact around said cylindrical portion and overlying said aperture, each said cylindrical surface formed with an axially extending groove for slidably receiving and engaging said engaging means, means for maintaining said arms in appropriate longitudinally spaced relationship along said cylindrical portion, connecting means on each of said steering arms for connecting each arm to a steering unit, and means for selectively positioning said slide means and said engaging means thereon within said bore for engaging said groove of one of said pair of steering arms and coupling that arm to said body.

3. In a multiple station steering system for a boat including a plurality of diversely spaced steering units drivingly connected respectively to a corresponding number of steering arms, the improvement comprising an interchange assembly for selectively coupling only one of said steering arms and the steering unit connected thereto to a rudder post, said interchange device comprising a body, means for rotatably mounting said body in a boat, coacting means for drivingly coupling said body to a rudder post, said body including a cylindrical portion disposed with its axis in alignment with the axis of rotation of said body and formed with an axial bore therein, said cylindrical portion provided with a pair of longitudinally extending elongated apertures positioned in diametrically opposed relationship and in communication with said bore, slide means slidably disposed and axially reciprocable in said bore, a pair of diametrically disposed engaging means on said slide means extending respectively through one of said pair of apertures and projecting beyond the periphery of said cylindrical portion, a plurality of steering arms each formed with a cylindrical bore defining a cylindrical surface disposed in rotatable bearing contact around said cylindrical portion and overlapping said apertures, each said cylindrical surface formed with a pair of diametrically opposed axially extending grooves for slidably receiving and engaging respective ones of said pair of engaging means, means for maintaining said arms in appropriate longitudinally spaced relationship along said cylindrical portion, coacting means on each of said steering arms for connecting each arm to a steering unit, and means for selectively positioning said slide means and said engaging means thereon within said bore for engaging one pair of said grooves of one of said steering arms and coupling that arm to said body.

4. In a dual station steering system for a boat including a pair of diversely spaced steering units drivingly connected respectively to a pair of steering arms, the improvement comprising an interchange assembly for selectively coupling only one of said steering arms and the steering unit connected thereto to a rudder post, said interchange device comprising a body, means for rotatably mounting said body in a boat, coacting means for drivingly coupling said body to a rudder post, a section of said body comprising a cylindrical tube disposed with its axis in alignment with the axis of rotation of said body, said tube provided with a pair of longitudinally extending diametrically opposed elongated apertures extending through the wall of said tube and disposed in communication with the interior thereof, a piston slidably disposed and axially reciprocable in said tube, a pair of engaging lugs disposed in diametrically opposed relationship on said piston and slidably disposed in said apertures and projecting beyond the periphery of said tube, a pair of steering arms each formed with a cylindrical bore defining a cylindrical surface disposed in rotatable bearing contact around the periphery of said tube and overlying said apertures, each said cylindrical surface formed with a pair of axially extending diametrically opposed grooves for slidably receiving and engaging the projecting ends of said lugs, retainer means for maintaining said arms in appropriate longitudinally spaced relationship along said tube, coacting means on each of said arms for connecting each arm to a steering unit, and means for reciprocating and selectively positioning said piston and said engaging lugs thereon within said tube for engaging said grooves of one of said arms and coupling that arm to said body.

5. In a dual station steering system for a boat including a pair of diversely spaced steering units drivingly connected respectively to a pair of steering arms, the improvement comprising an interchange assembly for selectively coupling only one of said steering arms and the steering unit connected thereto to a rudder post, said interchange device comprising a body, means for rotatably mounting said body in a boat, coacting means for drivingly coupling said body to a rudder post, a section of said body comprising a cylindrical tube disposed with its axis in alignment with the axis of rotation of said body, said tube provided with a pair of longitudinally extending diametrically opposed elongated apertures extending through the wall of said tube and disposed in communication with the interior thereof, a piston slidably disposed and axially reciprocable in said tube, a pair of engaging lugs disposed in diametrically opposed relationship on said piston and sildably disposed in said apertures and projecting beyond the periphery of said tube, a pair of steering arms each formed with a cylindrical bore defining a cylindrical surface disposed in rotatable bearing contact around the periphery of said tube and overlying said apertures, each said cylindrical surface formed with a pair of axially extending diametrically opposed grooves for slidably receiving and engaging the projecting ends of said lugs, retainer means for maintaining said arms in appropriate longitudinally spaced relationship along said tube, coacting means on each of said arms for connecting each arm to a steering unit, and push-pull cable means connected to said piston for reciprocating and selectively positioning said piston and said engaging lugs thereon within said tube for engaging said grooves in one of said steering arms and coupling that arm to said body.

6. A multiple station boat steering system comprising a plurality of diversely spaced steering units, an interchange device including a corresponding number of steering arms, means drivingly connecting each of said steering units to a respective one of said steering arms, said interchange device comprising a body, means for rotatably mounting said body in a boat, coacting means for drivingly coupling said body to a rudder post, said body including a cylindrical portion disposed with its axis in alignment with the axis of rotation of said body for rotatably supporting each of said steering arms in appropriate longitudinally spaced relationship thereon, said cylindrical portion formed with an axially extending bore and a longitudinally extending aperture disposed in communication with said bore and the periphery of said cylindrical portion, slide means slidably disposed in said bore and axially reciprocable therein, engaging means on said slide means extending through said aperture and projecting beyond the periphery of said cylindrical portion and adapted to engage and couple one of said steering arms to said body, and control means drivingly connected to said slide means for selectively positioning said slide means and said engaging means thereon within said bore for engaging and coupling one of said steering arms and the steering unit connected thereto to said body.

7. A multiple station boat steering system comprising a plurality of diversely spaced steering units, an interchange device including a corresponding number of steering arms, means drivingly connecting each of said steering units to a respective one of said steering arms, said interchange device comprising a body, means for rotatably mounting said body in a boat, coacting means for drivingly coupling said body to a rudder post, said body including a cylindrical portion disposed with its axis in alignment with the axis of rotation of said body for rotatably supporting each of said steering arms in appropriate longitudinally spaced relationship thereon, said cylindrical portion formed with an axially extending bore and a longitudinally extending aperture disposed in communication with said bore and the periphery of said cylindrical portion, slide means slidably disposed in said bore and axially reciprocable therein, engaging means on said slide means extending through said aperture and projecting beyond the periphery of said cylindrical portion and adapted to engage and couple one of said steering arms to said body, control means in said boat including push-pull cable means connected to said slide means and operative responsive to movement of said control means for selectively positioning said slide means and said engaging means thereon within said bore for engaging and coupling one of said steering arms and the steering unit connected thereto to said body.

8. A multiple station boat steering system comprising a plurality of diversely spaced steering units, an interchange device including a corresponding number of steering arms, means drivingly connecting each of said steering units to a respective one of said steering arms, said interchange device comprising a body, means for rotatably mounting said body in a boat, coacting means for drivingly coupling said body to a rudder post, said body including a cylindrical portion disposed with its axis in alignment with the axis of rotation of said body for rotatably supporting each of said steering arms in appropriate longitudinally spaced relationship thereon, said cylindrical portion formed with an axially extending bore and a longitudinally extending aperture disposed in communication with said bore and the periphery of said cylindrical portion, slide means slidably disposed in said bore and axially reciprocable therein, engaging means on said slide means extending through said aperture and projecting beyond the periphery of said cylindrical portion and adapted to engage and couple one of said steering arms to said body, a lever pivotally mounted in the boat, control means at each station including push-pull cable means drivingly connected to said lever for effecting controlled pivoting movement thereof, and push-pull cable means connected to said lever and said slide means for selectively positioning said slide means and said engaging means thereon within said bore responsive to movement of said control means for engaging and coupling one of said steering arms and the steering unit connected thereto to said body.

9. A multiple station boat steering system comprising a plurality of diversely spaced steering units, an interchange device including a corresponding number of steering arms, push-pull cable means connecting each of said steering units to a respective one of said steering arms, said interchange device comprising a body, means for rotatably mounting said body in a boat, coacting means for drivingly coupling said body to a rudder post, said body including a tubular portion disposed with its axis in alignment with the axis of rotation of said body for rotatably supporting each of said steering arms in appropriate longitudinally spaced relationship thereon, said tubular portion formed with a longitudinally extending aperture disposed in communication with a cylindrical bore defining the interior of said tubular portion and with the periphery of said tubular portion, a piston slidably disposed in said bore and axially reciprocable therein, engaging means on said piston extending through said aperture and projecting beyond the periphery of said tubular portion and adapted to engage and couple one of said steering arms to said body, and control means connected by a push-pull cable to said piston for axially reciprocating and selectively positioning said piston and said engaging means thereon within said tube for engaging and coupling one of said steering arms and the steering unit connected thereto to said body.

10. A dual station boat steering system comprising a pair of diversely spaced steering units, an interchange device including a pair of steering arms, a push-pull cable connecting each of said steering units to a respective one of said steering arms, said interchange device comprising a body, coacting means for securely mounting said body on a rotatably mounted rudder post, said body including a cylindrical tubular portion having an annular wall disposed with its axis in alignment with the axis of rotation of a rudder post for rotatably supporting each of said steering arms in appropriate longitudinally spaced relationship thereon, said annular wall formed with a pair of diametrically disposed longitudinally extending slots disposed in communication with the interior and exterior of said tubular section, a piston slidably disposed in said tubular section and axially reciprocable therein, engaging means including a pair of engaging lugs on said piston extending through each of said slots and projecting beyond the periphery of said tubular portion and adapted to engage diametrically disposed axially extending grooves formed in each of said steering arms for engaging and coupling one of said steering arms to said body, a transfer device including a pivotally mounted lever adapted to be positioned in a boat, control means at each steering station including a push-pull cable connected to said lever for angularly pivoting said lever to and from a first position and a second position, a push-pull cable operatively connecting said lever to said piston for axially reciprocating said piston and said engaging lugs thereon to and from a first position wherein one of said steering arms and the steering unit connected thereto are coupled to said body to a second position wherein the other of said steering arms is coupled to said body responsive to movement of said lever between said first and said second position by said control means.

11. A dual station boat steering system comprising a pair of diversely spaced steering units, an interchange device including a pair of steering arms, a push-pull cable connecting each of said steering units to a respective one of said steering arms, said interchange device comprising a body, coacting means for securely mounting said body on a rotatably mounted rudder post, said body including a cylindrical tubular portion having an annular wall disposed with its axis in alignment with the axis of rotation of a rudder post for rotatably supporting each of said steering arms in appropriate longitudinally spaced relationship thereon, said annular wall formed with a pair of diametrically disposed longitudinally extending slots disposed in communication with the interior and exterior of said tubular section, a piston slidably disposed in said tubular section and axially reciprocable therein, engaging means including a pair of engaging lugs on said piston extending through each of said slots and projecting beyond the periphery of said tubular portion and adapted to engage diametrically disposed axially extending grooves formed in each of said steering arms for engaging and coupling one of said steering arms to said body, control means conveniently located in said boat and including a push-pull cable connected to said piston for axially reciprocating said piston and said engaging lugs thereon to and from a first position wherein one of said steering arms and the steering unit connected thereto are coupled to said body to a second position wherein the other of said steering arms is coupled to said body responsive to movement of said push-pull cable by said control means.

No references cited.